United States Patent [19]

Dillman

[11] Patent Number: 5,331,038
[45] Date of Patent: Jul. 19, 1994

[54] ADHESIVE FOR MULTIPACKS

[75] Inventor: Steven H. Dillman, Houston, Tex.

[73] Assignee: Shell Oil Company, Houston, Tex.

[21] Appl. No.: 952,372

[22] Filed: Sep. 28, 1992

[51] Int. Cl.$^5$ .......................... C08F 8/04; C08L 51/00; C08L 53/00
[52] U.S. Cl. ..................................... 524/505; 524/271; 524/504; 525/98; 525/99
[58] Field of Search .................. 524/271, 505; 525/98, 525/99

[56] References Cited

U.S. PATENT DOCUMENTS

| | | | |
|---|---|---|---|
| 2,029,048 | 1/1936 | Atwood | 428/188 |
| 3,329,271 | 7/1967 | Ward et al. | 210/150 |
| 3,446,346 | 5/1969 | Burge | 206/151 |
| 3,598,677 | 8/1971 | Bergmeister et al. | 524/501 |
| 3,736,198 | 5/1973 | Leistner | 206/380 |
| 3,759,373 | 9/1973 | Werth et al. | 206/139 |
| 3,759,378 | 9/1973 | Werth | 229/238 |
| 3,802,987 | 4/1974 | Noll | 229/238 |
| 3,902,992 | 9/1975 | Schuster | 206/427 |
| 3,922,412 | 11/1975 | Yoshikawa et al. | 428/118 |
| 3,924,739 | 12/1975 | Gravesteijn | 206/157 |
| 4,050,579 | 9/1977 | Gorski et al. | 206/460 |
| 4,389,267 | 6/1983 | Denslow | 156/73.2 |
| 4,566,926 | 1/1986 | Stumpf | 156/165 |
| 4,574,949 | 3/1986 | Rhoads | 206/150 |
| 4,596,330 | 6/1986 | Benno | 206/427 |
| 4,615,444 | 10/1986 | de Larosiere | 206/427 |
| 4,650,829 | 3/1987 | Bossaert | 525/99 |
| 4,822,653 | 4/1989 | Kauffman | 524/505 |
| 4,857,594 | 8/1989 | Lakshmanan | 524/505 |
| 5,028,646 | 7/1991 | Miller | 524/505 |

*Primary Examiner*—Paul R. Michl
*Assistant Examiner*—Olga Asinovsky
*Attorney, Agent, or Firm*—Donald F. Haas

[57] ABSTRACT

The invention is an adhesive which comprises a linear hydrogenated tri-block copolymer of a vinyl aromatic hydrocarbon and a conjugated diene which has a coupling efficiency of 45% or greater and which has a peak molecular weight of from 50,000 to 150,000. For purposes of determining the concentration of the other components, the polymer is present in an amount of 100 parts rubber (phr). The adhesive further comprises from 30 to 110 phr of an endblock resin, a low molecular weight vinyl aromatic hydrocarbon, preferably alpha methyl styrene or styrene. Finally, the adhesive comprises from 80 to 210 phr of a hydrogenated hydrocarbon resin having a softening point below 35° C.

6 Claims, No Drawings

ADHESIVE FOR MULTIPACKS

BACKGROUND OF THE INVENTION

This invention relates to an adhesive for joining containers into cluster packages so as to eliminate the necessity for a plastic ring type carrier. More particularly, this invention relates to a method of joining two or more containers together so as to controllably adhere them together until one or more are removed from the cluster package.

There are many ways to package containers. One way is by the use of cardboard which is wrapped around the periphery of the containers. Cardboard eventually biodegrades but during the time it takes to degrade the cardboard poses a litter problem. Additionally, cardboard cartons are often difficult to open when a container is to be withdrawn from the carton. The cardboard cartons, in addition to being costly, do not permit proper display of the containers. In today's marketplace, merchandising and advertising are extremely important. Decorating the carton sides or edges adds to the time and cost to prepare the package. Moreover, since cardboard is susceptible to moisture, the integrity of the package is reduced or destroyed if the carton becomes wet.

Another way to package containers is illustrated in U.S. Pat. No. 3,446,346, which discloses a method of immersion or dipping of a group of filled containers into molten liquid so that the liquid solidifies on the ends of the containers and encases the ends to form a unitary package. Each container is then removed from the group by breaking apart the solidified plastic between the containers. However, a plastic end remains on each removed container during and after consumption, causing a substantial litter problem. This process of immersion or dipping is time consuming, costly and requires more materials.

Elastic film material has been stretched around containers to contain them, as in U.S. Pat. No. 4,596,330. However, these containers are not packaged to be individually removable one at a time from the package without the package losing its integrity and thus its ability to retain the other containers. This material does not lend itself to high speed article movement along conveyor systems.

The packaging of food and beverage containers into groups is often attempted through the use of plastic ring type can carriers which usually encircle the necks of each container, such as carbonated beverage and beer containers, enabling the removal of one or more cans as desired. See U.S. Pat. No. 4,574,949. These plastic ring type carriers can be an unsightly litter item on beaches, roadsides and parks and can pose an enviromental risk to wildlife who often become entangled in the carriers and die or are injured. In addition, the containers can rotate in the ring or web of the carrier so that the label of each container may not be lined up properly for display on store shelves. Thus, the containers must be rotated by hand in order to reposition the container labels correctly so that the consumer sees an attractive display.

In 1973 and 1975, Adolph Coors Company obtained three U.S. Pat. Nos. 3,759,373, 3,759,378 and 3,902,992, relating to adhesively bonding a multi-container package of cans or bottles together. There is no teaching in any of the three patents of what adhesive could be used for this application. An adhesive which could be used in such an application would have to be capable of hot melt application, be water resistant, be sufficiently strong to maintain the container package intact during normal shipping and handling, be weak enough that the containers may be easily removed from the package by the consumer, be able to maintain strength at room temperature and above and not be brittle at the colder temperatures at which the contents of the containers may be stored. This is an unusual combination of attributes which known adhesives are not required or equipped to achieve.

Thus, it can be seen that there is a need for an adhesive which can be effectively used in the clustering food and/or beverage containers so that the container package is non-littering, efficient, low cost, aesthetically pleasing to the customer, holds the containers in place without rotation, is environmentally desirable and provides the ability to remove each container individually without the package losing its integrity.

SUMMARY OF THE INVENTION

The invention is an adhesive which comprises a linear hydrogenated tri-block copolymer of a vinyl aromatic hydrocarbon and a conjugated diene which has a coupling efficiency of 45% or greater and which has a molecular weight of from 50,000 to 150,000. For purposes of determining the concentration of the other components, the polymer is present in an amount of 100 parts rubber (phr). The adhesive further comprises from 30 to 110 phr of an endblock resin having a molecular weight of from 1000 to 10,000, a low molecular weight vinyl aromatic hydrocarbon, preferably alphamethylstyrene or styrene. Finally, the adhesive comprises from 80 to 210 phr of a hydrogenated hydrocarbon resin having a softening point below 35° C.

In another embodiment of the present invention, the polymer contains carboxylic acid or anhydride functionality in the diene block. In a preferred embodiment of the present invention, the adhesive is applied to a container which has a shoulder at the shoulder thereof or just below it.

DETAILED DESCRIPTION OF THE INVENTION

The adhesive may be applied by a hot melt applicator tip, a spraying device, a roller, a doctor blade or a brush. The adhesive may be applied to the containers as one or more "dots" or as an axial bond line. The "dots" need not be circular in shape but may be any shape which is functional. Preferably, the adhesive is a hot melt adhesive which is applied hot and then hardens. Preferably, the adhesive is applied to the upper half of the container so that the cans can be peeled apart by grasping the bottoms of the cans as is done with ring-type containers. The adhesive may also be applied to the top edge of the container.

The containers are bonded so as to controllably adhere to one another. "Controllably adhere" means the containers are adhered together sufficiently to remain bonded together, despite shipping and handling of the containers, and yet have low enough bond strength so that the containers can be peeled away from the cluster pack by the consumer. The adhesion can be achieved by using adhesives or spot welding. A large cluster pack of twelve containers, for example, may be produced where the consumer may break off any desired number of containers such as a smaller cluster pack or a container cluster of several containers which are still adhered together for outings at which smaller groups of containers may be needed. This is advantageous because removing individual containers from the plastic ring type can carriers results in bulky handling of a lot of individual cans.

The adhesive preferably has a lap shear strength to aluminum of from 50 to 200 psi. This adhesion strength allows the container cluster or cluster pack to remain intact until such time as the buyer wishes to separate one container without the loss of bonding of the other containers in the cluster pack. The strength of the adhesive must be sufficient to retain the containers in adherence during shipping, handling and storage. The adhesive preferably should stick to either a metal or a plastic container, or to one which has had a label applied, although this is not an absolute requirement.

The containers of this invention may be for food or beverages. Preferably, the containers are for carbonated beverages such as soft drinks or beer. The containers are preferably cylindrically shaped and are made substantially of aluminum, steel, glass or plastic. Any number of containers may be arranged into container clusters and/or cluster packs. The most common arrangement is the six-pack. However, two, four, eight, ten, twelve or even odd numbered packs may be formed. The adhesive is preferable applied on the containers so that when the containers are bonded together and are oriented to display desired parts of the container, the label and/or the electronic scanning bar code which is used at supermarket check-out stands to read the price of the containers may be clearly seen.

It is highly preferable that the adhesive of the present invention be used in connection with containers which have a shoulder, curved or otherwise. For instance, most currently used soft drinks and beer cans have a small curved shoulder at the upper end of the can. If the adhesive is applied to the can at the shoulder or just below it, I have found that the removal of each can from the multipack is much easier because it allows a hinge effect since one can moves over the top of the next one to allow sufficient torque to cause the adhesive to fail as desired.

The polymers which may be used according to the present invention are linear triblock copolymers of conjugated dienes with vinyl aromatic monomers. This invention also encompasses functionalized polymers which incorporate the functionality described below and functionalized polymers wherein the functionality is in the conjugated diene section of the polymer. The polymers must be hydrogenated because hydrogenated polymers can be formulated into soft systems which are non-tacky and exhibit sufficiently broad service temperature ranges. They have the structure A-B-A, wherein A is a polymer block of a vinyl aromatic hydrocarbon and B is a polymer block of a conjugated diene.

The block copolymers may be produced by any well known block polymerization or copolymerization procedures including the well-known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference.

Conjugated dienes which may be utilized to prepare the polymers and copolymers include those having from 4 to 8 carbon atoms and also include 1,3-butadiene, 2-methyl-1,3-butadiene (isoprene), 2,3-dimethyl-1,3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene vinylnaphthalene, vinylanthracene and the like. The preferred vinyl aromatic hydrocarbon is styrene.

The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952, Reissue U.S. Pat. No. 27,145 and U.S. Pat. No. 5,039,755, the disclosures of which are herein incorporated by reference. The polymers are hydrogenated in such a manner as to produce hydrogenated polymers having a residual unsaturation content in the polydiene block of less than 20%, and preferably as close to zero percent as possible, of their original unsaturation content prior to hydrogenation.

The carboxylic acid functionalized block copolymers of the present invention are hydrogenated block copolymers as described above which have been reacted with various carboxylic acid functional group-containing molecules. The functional group containing molecules which may be reacted with such block copolymers to produce a functionalized block copolymer useful in the present invention include carboxylic acid or anhydride groups or derivatives thereof. The preferred acid monomers for functionalizing the polymers of the present invention are those which can be grafted onto the diene block of the polymer in free radical initiated reactions. Such monomers and functionalized polymers incorporating them are described in U.S. Pat. 4,578,429 which is herein incorporated by reference. The preferred modifying monomers are unsaturated mono- and poly-carboxylic-containing acids and anhydrides and other derivatives thereof. Examples of such monomers include maleic acid, maleic anhydride, fumaric acid and the other materials mentioned in the above-referenced patent.

The functionalized block copolymers utilized should contain from at least 0.2% of the functional groups because this ensures the desired improvement is obtained. Preferably, from 0.5% to 3% of the functional groups should be present in the polymer.

In the prior art, such as that exemplified by U.S. Pat. Nos. 3,595,941 and 2,468,972, the disclosures of which are herein incorporated by reference, the effort was always made to select the particular coupling agent or reaction conditions that resulted in the highest coupling efficiency. This means the highest ratio of triblock molecules to the total number of molecules (triblock plus diblock). High coupling efficiency is desired herein in order to produce strong adhesive compositions. Coupling efficiency is defined as the weight fraction of coupled polymer. Thus, when producing an SIS linear polymer, the coupling efficiency is shown by the following relationship:

$$\frac{\text{weight of Molecules of SIS}}{\text{weight of Molecules of SIS plus SI}}$$

Coupling efficiency can be determined theoretically from the stoichiometric quantity of coupling agent required for complete coupling or coupling efficiency can be determined by an analytical method such as gel permeation chromatography. Typical prior art coupling efficiency is from about 80% to almost 100%. In U.S. Pat. No. 4,096,203, coupling efficiency is controlled from about 20% to about 80%, preferably about 30% to about 70%. It is also within the scope of the present invention to blend polymers from processes of different coupling efficiency. For example, if a 60% efficiency is desired, then polymers from processes having an 80% efficiency and a 40% efficiency may be blended together.

This coupling efficiency is controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, respond very quickly and could easily be employed to cut short complete coupling of the polymers.

The coupling efficiency of the polymer used in adhesive of the present invention is 45% or greater and it preferably ranges from 45 to 75%. This coupling efficiency can be achieved by blending together two or more polymers of different coupling efficiencies. If the coupling efficiency is less than 45%, then the adhesive has insufficient cohesive strength to withstand normal handling. If the coupling efficiency is more than 75%, then the adhesive no longer adheres as well.

Further, the molecular weight of the polymers used herein ranges from 50,000 to 150,000. This molecular weight is the peak molecular weight of the tri-block species as determined by gel permeation chromatography using polystyrene calibration standards. If the molecular weight is less than 50,000, the polymer no longer has the extensibility to make an acceptable adhesive. If the molecular weight is more than 150,000, the viscosity becomes impractically high.

Based on 100 phr of the linear hydrogenated polymer, the adhesive must contain from 30 to 110 phr of an endblock resin which is generally a low molecular weight vinyl aromatic hydrocarbon, preferably alphamethylstyrene or styrene or copolymers thereof. The weight average molecular weight should be in the range of 1000 to 10,000. If the amount is less than 30 phr, the adhesive has insufficient strength and if the amount is more than 110 phr, the adhesive is too stiff to adhere well.

The third essential component of the adhesive of the present invention is a hydrogenated hydrocarbon resin having a softening point below 35° C. This resin should be present in an amount from 80 to 210 phr and if the amount is less than 80 phr, the adhesive is too hard to form a good bond and if the amount is more than 210 phr, the adhesive becomes too soft and tacky. An example of this type of resin is REGALREZ ® 1018 resin made by Hercules.

In addition, the relative amounts of endblock resin and hydrogenated hydrocarbon resin must be appropriately balanced. I have found that the following relationships should be observed:

$$H - 1.6E < 93$$

$$H + 1.3E > 175$$

$$H + 6.8E < 854$$

where H is the amount of hydrocarbon resin in phr and E is the amount of endblock resin in phr.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are highly saturated oils, e.g. Tufflo ® 6056 oil made by Arco. The amounts of rubber compounding oil employed in the invention composition can vary from about 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned hereinabove and their intended function as taught herein.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory.

EXAMPLES

The polymers used herein are described as follows:

Polymer A is a hydrogenated styrene-butadiene-styrene block copolymer having a molecular weight of about 75,000 and a coupling efficiency of essentially 100%.

Polymer B is a hydrogenated-styrene-butadiene block copolymer having a molecular weight of about 75,000 and a coupling efficiency of about 30%.

Polymer C is a hydrogenated styrene-butadiene-styrene block copolymer containing 1.8% by weight of grafted maleic anhydride groups, and with an effective coupling efficiency of about 75% and molecular weight of 75,000.

The endblock resin was KRISTALEX® 1120 resin from Hercules (molecular weight 4300) and the hydrogenated hydrocarbon resin was REGALREZ® 1018 resin from Hercules which has a softening point below 35° C. which, according to Hercules' published literature, are hydrocarbon resins derived primarily from α-methyl styrene and hydrogenated copolymer resins of pure hydrocarbon resins and styrenic based comonomers, respectively.

Other polymers evaluated were Polymer D, an unhydrogenated styrene-isoprene-styrene block copolymer having a molecular weight of 200,000 and a coupling efficiency of 84%, Polymer E, a branched styrene-butadiene block copolymer having a molecular weight of 136,000 and a coupling efficiency of 90% and Polymer F, a hydrogenated styrene-butadiene-styrene block copolymer having a molecular weight of about 67,000 and a coupling efficiency of 100%. Polymer G is a hydrogenated styrene-butadiene-styrene polymer similar to Polymer B except that it contains 1.9% by weight of grafted maleic anhydride groups.

Other resins used in the evaluation are PB 8910, a polybutylene resin, ZONATAC® 105, styrenated terpene, PERMALYN® 105, a pentaerythritol ester of rosin, ESCOREZ® 1310, a C5 hydrocarbon resin, TUFFLO® 6056, a parafinic oil, and SHELLMAX® 500, a microcrystalline wax.

The various adhesives were applied to ordinary aluminum cans by hot melt application at the shoulder of the can. The cans were washed with water and dried first. The bond was allowed to set for 24 hours. The cans were then soaked in ice water at 32° F. for 16 hours, allowed to stand at 73° F. for 24 hours or allowed to stand for 2 hours at 120° F. Then, separation, drop, and holding power tests were carried out.

In the separation test, the cans were bonded to form a six-pack. The cans were then removed one at a time with the quality of the bond rated on the following scale:

0—adhesive will not bond cans
1—cans bond, but six-pack cannot be picked up by a single can.
2—removal of a can causes entire six-pack to collapse.
3—removal of a can causes additional bonds to fail; bonds are sensitive to shock or vibration.
4—bonds judged good but fail adhesively; difficult to remove a can without causing additional bond failure. This is the minimum acceptable rating.
5—bonds fail cohesively; cans easily removed without causing additional bond failure; six-pack is shock and vibration resistant.

In the drop test, pairs of bonded cans oriented vertically were dropped from heights of 3 inches, 6 inches, and 12 inches. The greatest height at which bond failure occurred in less than 50% of the samples dropped was recorded. This provides a measure of the toughness of the adhesive bond.

In the holding power test, a six-pack of bonded cans was suspended from a single can. The time until bond failure occurred was recorded. This provides a measure of the strength of the adhesive bond.

The first 11 formulations which were evaluated are set forth below in Tables 1 and 2. The formulations within the scope of the present invention are formulations 6, 8 and 11 as shown in Table 3. Table 4 sets forth the results of the testing of formulations 12-22.

TABLE 1

| Formulations Evaluated POLYMER | | | | | | |
|---|---|---|---|---|---|---|
| | 1 | 2 | 3 | 4 | 5 | 6 |
| A | 50 | — | — | 100 | — | 30 |
| B | 50 | — | — | — | — | 70 |
| C | — | — | — | — | — | — |
| D | — | — | — | — | 100 | — |
| E | — | 100 | — | — | — | — |
| F | — | — | 100 | — | — | — |
| PB 8910 | — | — | — | 270 | — | — |
| KRISTALEX 1120 | 100 | 100 | — | 50 | — | 75 |
| ZONATAC 105 | — | 85 | — | — | — | — |
| PERMALYN 105 | — | — | 100 | — | 100 | — |
| ESCOREZ 1310 | — | — | — | — | — | — |
| REGALREZ 1018 | — | — | — | — | — | 140 |
| TUFFLO 6056 | 85 | — | — | — | — | — |
| SHELLMAX 500 | — | — | 200 | — | 200 | — |

TABLE 2

| Formulations Evaluated POLYMER | | | | | |
|---|---|---|---|---|---|
| | 7 | 8 | 9 | 100 | 11 |
| A | 30 | 30 | 30 | 30 | — |
| B | 70 | 70 | 70 | 70 | — |
| C | — | — | — | — | 100 |
| D | — | — | — | — | — |
| E | — | — | — | — | — |
| F | — | — | — | — | — |
| KRISTALEX 1120 | 50 | 100 | 50 | 100 | 75 |
| REGALREZ 1018 | 100 | 100 | 180 | 180 | 140 |

TABLE 3

| | 1 | 2 | 3 | 4 | 5 | 6 | 7 | 8 | 9 | 10 | 11 |
|---|---|---|---|---|---|---|---|---|---|---|---|
| Formulation | | | | | | | | | | | |
| Separation | | | | | | | | | | | |
| 32° F. | 5 | 2 | 1 | | 3 | 5 | | | | | 5 |
| 73° F. | 3 | 3 | 3 | 3 | 5 | 5 | 3 | 4 | 1 | 3 | 5 |
| 120° F. | 0 | 1 | 2 | | 4 | 5 | | | | | 4 |
| Holding Power (min) | | | | | | | | | | | |
| 32° F. | | | | | | >480 | | | | | >480 |
| 73° F. | | <1 | | | | 120 | | | | | 360 |
| 120° F. | | | | | | 10 | | | | | 18 |
| Drop Test (in) | | | | | | | | | | | |
| 32° F. | <3 | <12 | <3 | <3 | <3 | <3 | | | | | 3 |
| 73° F. | <6 | <12 | | <3 | <6 | <12 | | | | | 12 |
| 120° F. | <3 | <12 | 12 | | >40 | 12 | | | | | 12 |

TABLE 4

| Formulation | 12 | 13 | 14 | 15 | 16 | 17 | 18 | 19 | 20 | 21 | 22 |
|---|---|---|---|---|---|---|---|---|---|---|---|
| A | 30 | | | | | 30 | 15 | 30 | 30 | 30 | 30 |
| B | 70 | | 70 | 45 | 20 | | 85 | 70 | 70 | 70 | 70 |
| C | | 100 | 30 | 55 | 80 | | | | | | |
| G | | | | | | 70 | | | | | |
| KRISTALEX 1120 | 75 | 75 | 75 | 75 | 75 | 75 | 75 | 40 | 75 | 110 | 50 |
| REGALAREZ 1018 | 140 | 140 | 140 | 140 | 140 | 140 | 140 | 140 | 197 | 140 | 140 |
| Separation 73° F. | 4 | 5 | 1 | 4 | 4 | 4 | 3 | 5 | 5 | 3 | 5 |

It can be seen by reviewing the above tables that only the formulations of this invention, formulations, 6, 8, 11-13, 15-17, 19, 20, and 22, perform acceptably well.

I claim:

1. An adhesive for joining containers into cluster packages from which individual containers can be easily removed, consisting of:
   (a) 100 parts of a linear hydrogenated triblock copolymer of a vinyl aromatic hydrocarbon and conjugated diene which has a coupling efficiency of greater than 45% and a peak molecular weight of 50,000 to 150,000,
   (b) 30 to 110 parts of an endblock resin having a weight average molecular weight of from 1000 to 10000, and
   (c) 80 to 210 parts of a hydrogenated hydrocarbon resin having a softening point below 35° C;
wherein the following relationships are satisfied:

$$H - 1.6E < 93$$

$$H + 1.3E > 175$$

$$H + 6.8E < 854$$

where H is the amount of hydrocarbon resin and E is the amount of endblock resin.

2. The adhesive of claim 1 wherein the coupling efficiency is from 45 to 75%.

3. An adhesive for joining containers into cluster packages from which individual containers can be easily removed, consisting of:
   (a) 100 parts of a linear hydrogenated triblock copolymer of a vinyl aromatic hydrocarbon and conjugated diene which has a coupling efficiency of 45% or greater and a peak molecular weight of 50,000 to 150,000 and having carboxylic acid or anhydride groups grafted thereon,
   (b) 30 to 110 parts of an endblock resin having a weight average molecular weight of from 1000 to 10,000,
   (c) 80 to 210 parts of a hydrogenated hydrocarbon resin having a softening point below 35° C;
wherein the following relationships are satisfied:

$$H - 1.6E < 93$$

$$H + 1.3E > 175$$

$$H + 6.8E < 854$$

where H is the amount of hydrocarbon resin and E is the amount of endblock resin.

4. The adhesive of claim 3 wherein the coupling efficiency is from 45 to 75%.

5. A cluster package of containers which have a shoulder wherein the containers are bound together by the adhesive of claim 1 which is applied at or just below said shoulder.

6. A cluster package of containers which have a shoulder wherein the containers are bound together by the adhesive of claim 3 which is applied at or just below said shoulder.

* * * * *